United States Patent [19]

Moy

[11] Patent Number: 4,647,899
[45] Date of Patent: Mar. 3, 1987

[54] ELECTRICAL FILM RESISTOR
[75] Inventor: Alexander Moy, Evanston, Ill.
[73] Assignee: Beltone Electronics Corporation, Chicago, Ill.
[21] Appl. No.: 829,402
[22] Filed: Feb. 12, 1986

Related U.S. Application Data

[60] Continuation of Ser. No. 755,842, Jul. 17, 1985, abandoned, which is a division of Ser. No. 605,612, Apr. 30, 1984, Pat. No. 4,551,607.

[51] Int. Cl.$^4$ .............................................. H01C 1/012
[52] U.S. Cl. ............................... 338/309; 219/121 LJ; 338/195; 338/325
[58] Field of Search ............... 338/309, 195, 325, 327, 338/328; 219/121 LJ, 541, 543; 29/620

[56] References Cited

U.S. PATENT DOCUMENTS 3,889,223  6/1975  Selig et al. ........................... 338/195
4,352,005  9/1982  Evans et al. ............. 219/121 LH X Primary Examiner—C. L. Albritton
Attorney, Agent, or Firm—Allegretti, Newitt, Witcoff & McAndrews, Ltd.

[57] ABSTRACT

An electrical film resistor. The film resistor includes a substrate, resistive film, and first and second terminals. The first terminal includes a first electrode. The second terminal includes second and third electrodes. The second electrode is close to the first electrode, and the third electrode is spaced apart from the first electrode. Moreover, the second and third electrodes are electrically interconnected. A kerf may be cut in the resistive material to increase the resistance between the two terminals and eventually substantially electrically isolate the second electrode from the first terminal. Thereafter, kerfs may be cut in the resistive material between first and third electrodes to further increase the resistance between the two terminals.

1 Claim, 4 Drawing Figures

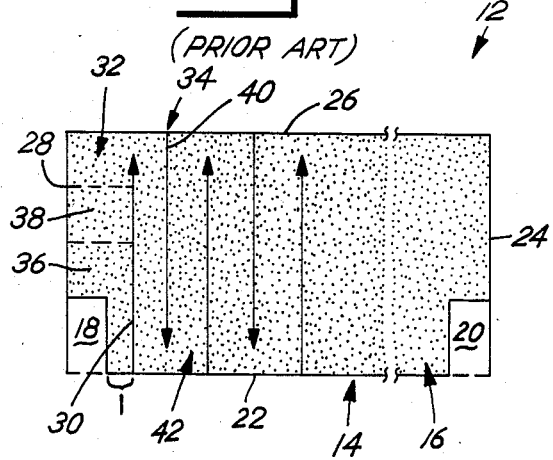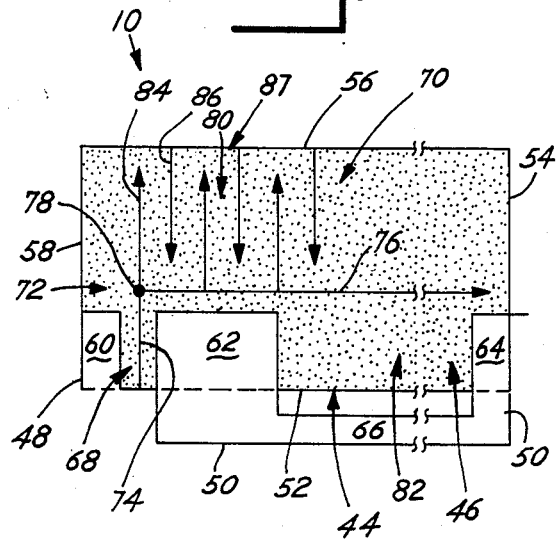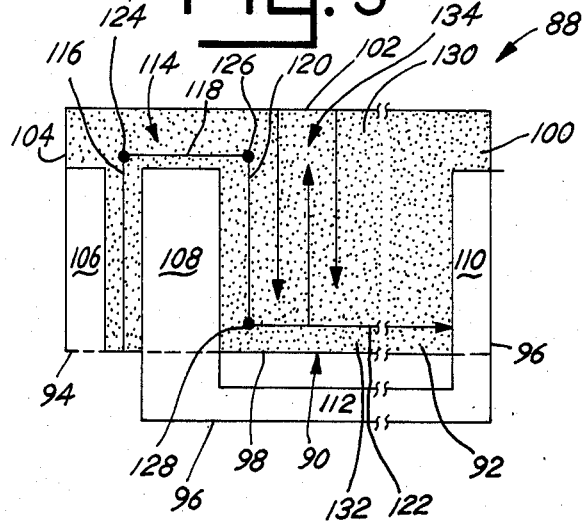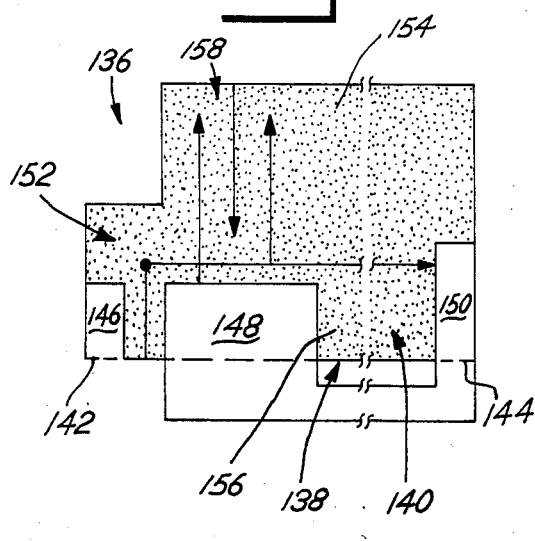

4,647,899

ELECTRICAL FILM RESISTOR

BACKGROUND OF THE INVENTION

This is a continuation of application Ser. No. 755,842, filed July 17, 1985 now abandoned. Application Ser. No. 755,842 is a divisional of application Ser. No. 605,612, now issued as U.S. Pat. No. 4,551,607.

The present invention relates to an electrical resistor and more particularly to an electrical film resistor that may be trimmed to exhibit a predetermined resistance.

In order to help reduce the size of electronic products to more easily provide connections for components, electronic elements are often formed on a board, or substrate, rather than being made as discrete components and applied to the board. Resistors are often formed in such a manner by first making an electrically non-conductive substrate. A layer of an electrically resistive material and at least two electrically conductive terminals are applied to the substrate.

Electrical current may flow between the terminals through the electrically resistive film. The level of resistance between the terminals is determined by the physical geometry of the film between the terminals.

The geometry of the film between the two terminals is often changed by "trimming," or removing, selected portions of the film from the substrate. A laser may be used, for example, to make a "kerf," or cut, in the film and necessarily change the pattern of current flow through the film on the substrate.

Many applications, such as in hearing aids, require the manufacturer of the resistor to gradually vary the resistance between the terminals after the film has been applied to the substrate. Many presently available methods for trimming such film resistors, however, are not ideally suited for trimming over wide resistance ranges. As a result, the size of the substrate and film is larger than may otherwise be necessary.

In addition, many currently available film resistors exhibit resistance "drift." Thus, after the film resistor has been trimmed, the electrical resistance that it exhibits may, for example, vary over time or vary as a result of being exposed to different ambient temperatures. Such instability in the resistance may impair the performance of the electrical device incorporating the film resistor. Alternatively, the design of the electrical device may have to be larger and more complex than otherwise necessary in order to compensate for the drift that the film resistor exhibits.

SUMMARY OF THE INVENTION

In a principal aspect, the present invention is a film resistor having first and second terminals and an electrically non-conductive substrate. In addition, the resistor includes an electrically resistive film applied to the substrate in contact with the terminals.

The film provides a substantially predetermined resistance for each square unit of area on the substrate. Also, it may be removed from the substrate in a predetermined pattern (such as kerfs made by a laser).

The first terminal includes a first electrode. The second terminal includes second and third electrodes. The second electrode is displaced a first predetermined distance from the first electrode.

The third electrode is displaced a second predetermined distance from the first electrode, and this second predetermined distance is larger than the first predetermined distance. Nonetheless, the second and third electrodes are electrically interconnected.

As a result, the resistance between the terminals may be increased by selectively removing the film between the first and second electrodes until the second electrode is substantially electrically isolated from the first electrode. Thereafter, if needed, the resistance between the terminals may be further increased by selectively removing the resistive film between the first and third electrodes.

In another principal aspect, the present invention is a process for making a film resistor having first and second terminals which are applied to an electrically non-conductive substrate. The first terminal includes a first electrode. The second terminal includes second and third electrodes which are electriclly interconnected.

An electrically resistive film is applied to the substrate, in contact with the three electrodes. The film may then be removed from the substrate between the first and second electrodes so that the resistance between the first and second terminals may be gradually increased.

If the resistor is required to exhibit additional resistance, the removal of the film continues until the second electrode is substantially electrically isolated from the first electrode. Thereafter, the film is removed from between the first and third electrodes. In this manner, the resistance between the first and second terminals may increase still further.

Thus, an object of the present invention is an improved electrical film resistor. Another object is a smaller film resistor that may be gradually trimmed to exhibit a greater range of resistance values. Still another object is a film resistor with improved drift stability that more precisely maintains a particular resistance value after trimming.

Yet another object of the present invention is an improved process for making a film resistor. Still another object is a process for making a smaller film resistor that may be gradually trimmed to exhibit a greater variety of resistance values. An additional object is a process for making a film resistor that exhibits greater drift stability. These and other objects, features, and advantages of the present invention are discussed or apparent in the following detailed description.

BRIEF DESCRIPTION OF THE DRAWING

Preferred embodiments of the present invention are described herein with reference to the drawing wherein:

FIG. 1 is a schematic representation of a top plan view of an electrical film resistor commonly used prior to applicant's present invention;

FIG. 2 is a schematic representation of a top plan view of a preferred embodiment of the electrical film resistor, which is distinguished from the electrical film resistor shown in FIG. 1;

FIG. 3 is a schematic representation of a top plan view of a second preferred embodiment of the present invention, showing electrodes extending further into the substrate than the embodiment shown in FIG. 2; and FIG. 4 is a schematic representation of a top plan view of a third preferred embodiment of the present invention, showing a substrate having a more irregular shape than the embodiment shown in FIG. 2.

DETAILED DESCRIPTION OF A PREFERRED EMBODIMENT

Referring to FIGS. 1-4, a preferred embodiment of the present invention is shown as an improved electrical film resistor 10. The film resistor 10 may be used in any application where a thick or thin film resistor is required. The film resistor 10 of the present invention, however, may be used to great advantage where the resistor must be capable of exhibiting a wide variety of resistive values, be physically small, and offer superior drift characteristics. Thus, for example, the film resistor 10 may be used to great advantage in constructing a hearing aid (not shown).

FIG. 1 demonstrates a previously known film resistor 12. The film resistor 12 includes an electrically non-conductive substrate 14, resistive film 16 applied thereto, and first and second terminals 18, 20.

The substrate 14 substantially defines a rectangle having first, second, third, and fourth edges, respectively marked 22, 24, 26, and 28. In the example shown in FIG. 1, the first and third edges 22, 26 are each approximately 1.2 inch long and the second and fourth edges are each approximately 0.95 inch long.

The resistive film 16 is applied at a substantially uniform thickness over the substrate 14. The electrical resistance between two large areas, or electrodes, on the film resistor 10 is then a function of the geometry of the resistive film 16 between the two electrodes.

More precisely, the resistance is substantially a function only of the length and width of the area of the resistive film 16 between the two areas. Thus, for example, assume that the resistive film 16 between two electrodes (not shown) is an area, or square, measuring 0.1 inch long by 0.1 inch wide. The resistance would be the same if the area between the two electrodes measured 1.0 inch long by 1.0 inch wide. Notably, however, the resistance between the two electrodes would be tripled if the area between the two electrodes measured 0.3 inch long by 0.1 inch wide.

Thus, as those skilled in the art will recognize, the resistance between two electrodes is determined by the number of "square units of resistive film" or "squares," between the two electrodes. The size of the squares has no substantial, direct influence on the resistance between the electrodes.

In algebraic terms, the resistance between the two electrodes for a simple case may be expressed by the following formula:

were $R = (P_B L)/(t\ W) = (P_B)/(t) \times N$ where

R = Resistance between the two electrodes, expressed in ohms;
$P_B$ = Bulk resistivity of the resistive film, expressed in ohm centimeters;
t = thickness of the resistive film on the substrate, expressed in centimeters;
L = length of the area between the two electrodes, expressed in centimeters;
W = width of the area between the two electrodes, expressed in centimeters; and
N = number of "squares" of resistive film between the two electrodes (dimensionless).

Thus, the electrical resistance between two electrodes may be increased by increasing the number of squares (of resistive material) between the two electrodes.

The first and second terminals 18, 20 of the film resistor 12 are separated by approximately 1 inch (FIG. 1). Before any of the resistive film 16 is selectively removed from the substrate 14, current may flow through the resistive material, directly between the first and second terminals 18, 20.

The number of squares, and thus the electrical resistance, between the first and second terminals 18, 20 may be gradually increased by selectively removing the resistive film 16 from the substrate 14 in a predetermined pattern and "forcing" the current to take a more indirect route from one terminal to the other.

Thus, for example, a computer controlled yttrium aluminum garnet (YAG) or carbon dioxide ($CO_2$) laser (not shown), specifically designed for trimming resistor elements, may be used to make kerfs in the resistive film 16. Other known techniques, however, such as abrasive trimming, may also be employed to make the kerfs.

The trimming does not substantially affect the substrate, but does remove a narrow strip of the resistive film 16. As shown in FIG. 1, a first kerf 30 may be made, dividing the resistive film 16 into left and right sections 32, 34.

Before the first kerf 30 is made, the current can flow, in a substantially straight line, between the first and second terminals 18, 20. The first kerf 30, however, causes the current from the first terminal 18 to flow through the left section 32 before traveling to the second terminal 20.

As the first kerf 30 is drawn from the first edge 22 toward the third edge 26, the resistance between the first and second terminals 18, 20 gradually increases. As shown in FIG. 1, the first kerf 30 increases the resistance of the film resistor 12 by over two squares (which have been illustratively marked with dotted lines in FIG. 1 and designated 36 and 38.

As previously indicated, the resistance between the first and second terminals 18, 20 may be monitored and the cutting of the first kerf 30 curtailed when a appropriate resistance level has been obtained. If the resistance exhibited by the film resistor 12 is still too low after the first kerf 30 has been made, however, a second kerf 40 may be made parallel to the first kerf 30. The second kerf 40 may begin at the third edge 26 of the film resistor 12 and be cut toward the first edge 22, thus increasing the number of squares of resistive film 16 that the current must flow through when traveling between the first and second terminals 18, 20.

If, after completing the second kerf 40, additional resistance is still required between the first and second terminals 18, 20, additional kerfs 42 may be made in a manner similar to that previously described for the first and second kerfs, 30, 40. The "zig-zag" pattern of kerfs shown in FIG. 1 was previously known in the art and is often referred to as a "serpentine cut."

The ratio between the highest resistance that a film resistor will exhibit (after kerfs have been cut), divided by the lowest resistance that the film resistor 12 can exhibit (before any kerfs are cut), is often referred to as a "trimming ratio." The trimming ratio is thus a measure of how variable a film resistor may be. The trimming ratio, multiplied by the resistance per square of the particular resistive film used, provides the range of resistance values which may be achieved by the film resistor.

The size of the substrate, together with applicant's observation that no square of resistive material should be less than 0.01 inch by 0.01 inch, suggests that the "serpentine cut" shown in FIG. 1 provides a trimming ratio of less than 75:1.

If the substrate 14 were to be lengthened, the first and second terminals 18, 20 could be moved further apart, and additional kerfs could be cut between the first and second terminals 18, 20. Moving the first and second terminals 18, 20 further apart, however, also increases the resistance between the first and second terminals 18, 20 before any kerfs are cut. Thus, the trimming ratio (which equals the ratio of the greatest possible resistance divided by the lowest possible resistance) will increase only a relatively small amount if the film resistor 12 is made longer and the first and second terminals 18, 20 are moved further apart.

Applicant has discovered, however, that the trimming ratio of a film resistor may be increased significantly by using the film resistor 10 shown in FIG. 2. The film resistor 10 is formed on an electrically non-conductive board, or substrate 44. The film resistor 10 also includes an electrically resistive film 46, together with first and second terminals 48, 50, which are applied to the substrate 44.

The substrate 44 of the preferred embodiment is made of Alumina ($Al_2O_3$). Other substances, however, such as beryllia (BeO), or glass, may be used to construct the substrate 12. The substrate 44 defines a rectangle having first, second, third, and fourth edges, 52, 54, 56, 58. The first and third edges 52, 56 are each approximately 1.35 inch long, and the second and fourth edges 54, 58 are each approximately 0.95 inch long. (Notably, all figures shown, including FIG. 1, are drawn for illustrative purposes and not drawn to scale.)

The film resistor 10 of the present invention may be used as either a thick or thin film resistor. In the preferred embodiment used by applicant, however, the resistive film 46 is of the "thick" variety. Thus, the resistive film 46 is comprised of a material, such as ruthenium oxide, which offers a predetermined electrical resistance for each square unit of the resistive film 46 on the substrate 44. A layer of the resistive film 46, at least 10 micrometer thick, is applied to the substrate 44, dried, and then fired in air at a temperature between 750° centigrade to 1000° centigrade. The resistive film 46 on the substrate 44 then offers a resistance of approximately 500 ohms per square.

The first terminal 48 includes a first electrode 60 along with associated hardware that interconnects the first electrode 60 with other components within an electrical device (not shown). The first terminal 48 is attached to the substrate 44 and is in electrical contact with the resistive film 46.

The second terminal 50, however, includes second and third electrodes 62, 64, and a conductor 66 for electrically interconnecting the second and third electrodes 62, 64. The second terminal 50 also, of course, includes the associated hardware that interconnects the second and third electrodes 62, 64 with other components within an electrical device (not shown).

The first and second electrodes 60, 62 are positioned on the substrate 44 approximately 0.02 inch from each other, with a first area 68 of resistor film 46 between them. The third electrode 64, however, is approximately 0.85 inch from the first electrode 60, with a second area 70 between the first and third electrodes 60, 64.

Initially, before any kerfs are made, substantially all resistance between the first and second terminals 48, 50 is provided by the resistive film 46 in the first area 68 between the first and second electrodes 60, 62.

As before, the resistance between the first and second terminals 48, 50 is monitored and, if additional resistance is desired, kerfs may be cut into the resistive film 46. Once a desired level of resistance between the first and second terminals 48, 50 is obtained, the cutting of the kerfs is discontinued.

A first kerf 72, having first and second segments, 74, 76 may be cut into the first area 68 of the resistive film 46. The first segment 74 of the first kerf 72 is cut substantially midway between the first and second electrodes 60, 62. The first segment 74 of the first kerf 72 is discontinued when the kerf 72 reaches a turning point 78 approximately 0.01 inch past the first and second electrodes 60, 62. The second segment 76 of the first kerf 72 starts at the turning point 78 and continues toward the second edge 54.

As before, the resistance between the first and second terminals 48, 50 gradually increases as the first kerf 72 is made. When the second segment 76 of the first kerf 72 approaches the second edge 54, the second electrode 62 is substantially electrically isolated from the first terminal 48. However, most of current from the first terminal 48 flows instead into the third electrode 64.

As shown in FIG. 2, the second segment 76 of the first kerf 72 is discontinued before it comes closer than 0.01 inch to the second edge 54. The first kerf 72 has then substantially divided the substrate into upper and lower regions 80, 82. If the film resistor 10 is required to exhibit still more resistance, additional kerfs may be cut into the upper region 80, as shown in FIG. 2.

A second kerf 84 may thus be cut into the upper region 80 of resistive film 46 on the substrate 44. The second kerf 84 begins at the turning point 78 and extends toward the third edge 56.

The second kerf 84 stops at least 0.01 inch from the third edge 56. If the second kerf 84 did reach the third edge 56, the first terminal 48 would be electrically isolated from the second terminal 50, effectively eliminating the usefulness of the film resistor 10.

Applicant has observed that the second kerf 84 should be cut no closer than 0.01 inch from the third edge 56. Otherwise, the resistance exhibited by the film resistor 10 may vary, or drift, both initially, during processing, and later, over time.

When the laser (not shown) makes any kerf, microcracks (not shown) may occur in the resistive film 46 about the kerf. Thus, if the second kerf 84 extends substantially closer than 0.01 inch to the third edge 56, the microcracks may extend between the kerf 84 and third edge 56. Such microcracks may significantly alter the resistance of the film resistor 10 in a substantially unpredictable manner.

If required, a third kerf 86 may be cut parallel to the second kerf 84. The third kerf 86 is approximately 0.01 inch from the second kerf 84. The third kerf 86 begins at the third edge 56 of the substrate 44 and extends toward the first edge 52. The third kerf 86 stops at least 0.01 inch from the second segment 76 of the first kerf 72.

Applicant has observed that the third kerf 86 should be made no closer than 0.01 inch to the first or second kerfs 72, 84. Otherwise, microcracks in the resistive film 42 between the first and third kerfs 72, 86 or between the second and third kerfs 84, 86 may cause a substantially unpredictable drift in the resistance exhibited by the film resistor 10.

Additional kerfs 87 may be cut into the upper region 80 of the resistive film 46, in a manner similar to that previously described for the second and third kerfs 84, 86. Using the film resistor 10 shown in FIG. 2, applicant has obtained a trimming ratio of over 170:1. Thus, the film resistor 10 of applicant's invention exhibits a significantly higher trimming ratio and offers a higher range of possible values.

Moreover, since no kerf is cut closer than approximately 0.01 inch from the edges 52-58 of the substrate 44 or from other kerfs, microcracks have a reduced impact on the resistance exhibited by the film resistor 10. Thus, the film resistor 10 offers improved stability against "shift" in the resistance value that it exhibits.

Since the first and second electrodes 60, 62 of the film resistor 10 are relatively close, the minimum resistance exhibited between the first and second terminals 48, 50 (before any kerfs are cut) is rather low. However, kerfs may be cut in the resistive film 46 so that the second electrode 62 is gradually isolated from the first electrode 60 and the resistance between the first and second terminals 48, 50 gradually increases.

After the second electrode 62 is substantially electrically isolated, most current from the first electrode 60 flows into the third electrode 64. Since the second and third electrodes 62, 64 are electrically interconnected, however, the gradual isolation of the second electrode 62 is not apparent to other electrical components which utilize or monitor the electrical properties of the film resistor 10.

The third electrode 64 is displaced farther away from the first electrode 60 than is the second electrode 62. Thus, the resistance between the first and second terminals 48, 50 may be further increased by cutting kerfs between the first and third electrodes 60, 64.

Notably, different configurations of the substrate 44, resistive film 46, and terminals 48, 50 may be incorporated in different embodiments of the present invention. Thus, in the preferred embodiment shown in FIG. 3, a film resistor 88 is shown having a substrate 90, resistive film 92, and first and second terminals 94, 96. As before, the substra be incorporated in different embodiments of the present invention. Thus, in the preferred embodiment shown in FIG. 3, a film resistor 88 is shown having a substrate 90, resistive film 92, and first and second terminals 94, 96. As before, the substrate 90 defines a rectangle having first, second, third, and fourth edges 98, 100, 102, 104. Again, the first and third edges 98, 102 are approximately 1.35 inches long and the second and fourth edges 100, 104 are approximately 0.95 inch long.

The first terminal 94 includes a first electrode 106, and the second terminal 96 includes second and third electrodes 108, 110, which are electrically interconnected via a conductor 112. Also, as before, the third electrode 110 is displaced further from the first electrode 106 than is the second electrode 108.

All electrodes 108-110 of the film resistor 88, however, are approximately 1 inch long. Thus, a first kerf 114 may be cut into the resistive film 92 which includes first, second, third, and fourth segments 116, 118, 120, 122 separated, respectively, by first, second, and third turning points 124, 126, 128.

The first segment 116 of the first kerf 114 extends from the first edge 98 of the substrate 90 toward the third edge 102. The first segment 116 stops at the first turning point 124, which is located approximately 0.11 inch from the first edge 98. The second segment 118 of the first kerf 114 extends from the first turning point 124 toward the second edge 100, until it reaches the second turning point 126. The third segment 120 extends from the second turning point 126 toward the first edge 98, and stops approximately 0.01 inch from the first edge 98.

The third turning point 128 is roughly 0.01 inch from the first edge 98, and the fourth segment 122 of the first kerf 114 extends therefrom toward the second edge 100. The fourth segment 122 abuts the third electrode 110, such that the second electrode 108 is substantially entirely electrically isolated from the first electrode 106. Current may still flow between the first and third electrodes 106, 110, however. The first kerf 114, as before, divides the film resistor 88 into upper and lower regions 130, 132, and additional kerfs 134 may be cut into the resistive film 92 as required. See FIG. 3.

Yet another configuration of the present invention is shown in FIG. 4. A film resistor 136 is shown having a substrate 138, resistive film 140, and first and second terminals 142, 144.

Unlike the substrate 44 shown in FIG. 2, however, the substrate 138 is irregularly shaped. Nonetheless, the basic principles for making and using the film resistor 136 represented in FIG. 4 are the same as for the film resistor 10 represented in FIG. 2.

The first terminal 142 includes a first electrode 146. The second terminal 144 includes second and third electrodes 148, 150 which are electrically interconnected.

The first and second electrodes 146, 148 are close to each other, and a first kerf 152 may be cut between them to gradually increase the resistance (increase the number of squares of the resistive film 140) between them.

In the film resistor 136 of FIG. 4, however, unlike the film resistor 10 of FIG. 2, the first kerf 152 is continued until it substantially entirely electrically isolates the second electrode 148 from the first electrode 146. The first kerf 152 has then divided the film resistor 136 into upper and lower regions 154, 156, and, as before, additional kerfs 158 may be cut into upper region 154 to increase the resistance between the first and third electrodes 146, 150 and thus between the first and second terminals 142, 144.

Preferred embodiments of the present invention have been described herein. It is to be understood, however, that changes and modifications can be made without departing from the true scope and spirit of the present invention. Thus, for example, the present invention may still be used even though the order of the steps or the materials used to make the film resistor 10 are different than previously described. The true scope and spirit of the present invention are defined by the following claims, to be interpreted in light of the foregoing specification.

I claim:

1. A film resistor comprising, in combination:
   an electrically non-conductive substrate;
   an electrically resistive film applied to said substrate, said resistive film providing a substantially predetermined electrical resistance for each square unit of area and capable of being selectively removed, in a predetermined pattern, from said substrate;
   a first terminal applied to said substrate in contact with said resistive film, said first terminal including a first electrode; and
   a second terminal applied to said substrate in contact with said resistive film, said second terminal including a second electrode applied to said substrate in contact with said resistive film, said second electrode displaced a first predetermined distance from said first electrode, whereby electrical resistance between said first and second electrodes is increased by selectively removing, in a predetermined pattern, resistive film from said substrate, and a third electrode applied to said substrate in contact with said resistive material, said second and third electrodes being substantially electrically interconnected off said resistive material, said third electrode displaced a second predetermined distance from said first electrode, and said second predetermined distance being greater than said first predetermined distance, whereby said resistive film may be selectively removed from said substrate between said first and second electrodes until said second electrode is substantially electrically isolated from said first electrode and whereby said resistance between said first and second terminals may thereafter be further increased by selectively removing, in a predetermined pattern, said resistive film from said substrate between said first and third electrodes.

* * * * *